(12) United States Patent
Kim

(10) Patent No.: US 12,227,233 B2
(45) Date of Patent: Feb. 18, 2025

(54) STEERING CONTROL METHOD OF REDUNDANT STEERING SYSTEM

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 203 days.

(21) Appl. No.: 17/817,324

(22) Filed: Aug. 3, 2022

(65) Prior Publication Data
US 2023/0045433 A1   Feb. 9, 2023

(30) Foreign Application Priority Data
Aug. 9, 2021   (KR) .................. 10-2021-0104398

(51) Int. Cl.
| | |
|---|---|
| *B60W 10/20* | (2006.01) |
| *B60W 50/023* | (2012.01) |
| *B62D 5/00* | (2006.01) |
| *B62D 5/04* | (2006.01) |

(52) U.S. Cl.
CPC ........... *B62D 5/0463* (2013.01); *B62D 5/003* (2013.01); *B62D 5/0484* (2013.01)

(58) Field of Classification Search
CPC ..... B62D 5/0463; B62D 5/003; B62D 5/0484
See application file for complete search history.

(56) References Cited

U.S. PATENT DOCUMENTS

| | | | |
|---|---|---|---|
| 2018/0335357 A1* | 11/2018 | Jo ..................... | B62D 15/0245 |
| 2022/0135116 A1* | 5/2022 | Won ................... | B62D 5/046 |
| | | | 701/42 |

FOREIGN PATENT DOCUMENTS

KR   10-2020-0022674   3/2020

OTHER PUBLICATIONS

English Language Abstract of KR 10-2020-0022674 published Mar. 4, 2020.

\* cited by examiner

*Primary Examiner* — Jess Whittington
*Assistant Examiner* — Rami Nabih Bedewi
(74) *Attorney, Agent, or Firm* — DLA Piper LLP US

(57) ABSTRACT

A steering control method for a redundant steering system. The method includes: receiving, by a first steering controller and a second steering controller, a first command signal and a second command signal, respectively; and synchronizing control outputs of the first steering controller and the second steering controller in a way that at least one of the first steering controller and the second steering controller compensates a control timing according to the first command signal and the second command signal so that the control outputs are synchronized.

7 Claims, 4 Drawing Sheets

STEERING CONTROL METHOD OF REDUNDANT STEERING SYSTEM

CROSS-REFERENCE TO RELATED APPLICATION

This application claims priority from and the benefit of Korean Patent Application No. 10-2021-0104398, filed on Aug. 9, 2021, which is hereby incorporated by reference for all purposes as if set forth herein.

BACKGROUND

Field

Exemplary embodiments of the present disclosure relate to a steering control method of a redundant steering system, and more particularly, to a steering control method of a redundant steering system, which controls operation timings of a first steering controller and a second steering controller in a redundant steering control system for the autonomous vehicle.

Discussion of the Background

When autonomous vehicles travel, the autonomous vehicles recognize their surroundings and determine their traveling routes through their external information detecting and processing functions, and independently travel using their own power.

Even when a driver does not operate a steering wheel, an accelerator pedal, a brake, or the like, an autonomous vehicle can adjust a speed thereof in a travelling direction according to a road shape by itself and travel to a destination while avoiding a collision with obstacles on a route.

An autonomous vehicle, to ensure the safety of riders in response to the occurrence of a fault during autonomous travelling, requires all the components in pairs, and the steering system, for example, a motor driven power steering (MDPS), cannot be exceptional.

For such a reason, a fully redundant MDPS is designed to have a structure in which a first MDPS and a second MDPS are combined and are designed to provide internal communication for fault status diagnosis and output correction for each other.

The background technology of the disclosure is disclosed in Korean Patent Application No. 10-2020-0022674 (registered on Mar. 4, 2020 and entitled "Vehicle failure handling control device and method thereof").

SUMMARY

In the related art, to control a fully redundant motor driven power steering (MDPS), a control command is input to each of a first MDPS and a second MDPS. When timings of the control command input to a first MDPS and a second MDPS are different, the first MDPS and the second MDPS can generate outputs that are different from each other. In this case, the control of the fully redundant MDPS becomes unstable and the performance of noise, vibration & harshness (NVH) can be affected.

In addition, when there is a problem in any one of Controller Area Network (CAN) lines used for the control command input to the first MDPS and the second MDPS, a signal received from a line working normally should be transmitted using an internal communication to the MDPS connected to a line not working normally. In this case, since an internal communication delay is generated to cause a control error, control for compensating for the delay is necessary.

Various embodiments are directed to a steering control method of a redundant steering system to solve the problems, and objects according to an aspect of the present disclosure are to provide the steering control method of the redundant steering system in which the performance of a redundant MDPS system is improved by matching operation timings of a first steering controller and a second steering controller.

According to an aspect of the present disclosure, there is provided a steering control method of a redundant steering system including: receiving, by a first steering controller and a second steering controller, a first command signal and a second command signal, respectively; and synchronizing control outputs of the first steering controller and the second steering controller in a way that at least one of the first steering controller and the second steering controller compensates a control timing according to the first command signal and the second command signal so that the control outputs are synchronized.

Each of the first command signal and the second command signal may be a command steering angle or column torque.

In the synchronizing of the control outputs of the first steering controller and the second steering controller, the first steering controller and the second steering controller may determine control timings based on alive count values of the first command signal and the second command signal, respectively.

In the synchronizing of the control outputs in a way that at least one of the first steering controller and the second steering controller compensates the control timing, the first steering controller and the second steering controller may exchange the first command signal and the second command signal with each other and may determine the control timing according to a difference between the alive count value of the first command signal and the alive count value of the second command signal and an alive count cycle.

Each of the first steering controller and the second steering controller may be an MDPS system or an electronic power steering (EPS) system.

In another embodiment, there is provided a steering control method of a redundant steering system including: receiving, by a first steering controller, a command signal; and synchronizing control outputs of the first steering controller and a second steering controller by compensating, by the first steering controller, a control timing for a predetermined set time.

The command signal may be a command steering angle or column torque.

The predetermined set time may be a delay time during internal communication between the first steering controller and the second steering controller.

The first steering controller may be an MDPS system or an EPS system.

The steering control method of the redundant steering system provided according to an aspect of the present disclosure improves the performance of the redundant MDPS system by matching the operation timings of the first steering controller and the second steering controller.

DETAILED DESCRIPTION OF THE ILLUSTRATED EMBODIMENTS

Figure 1:
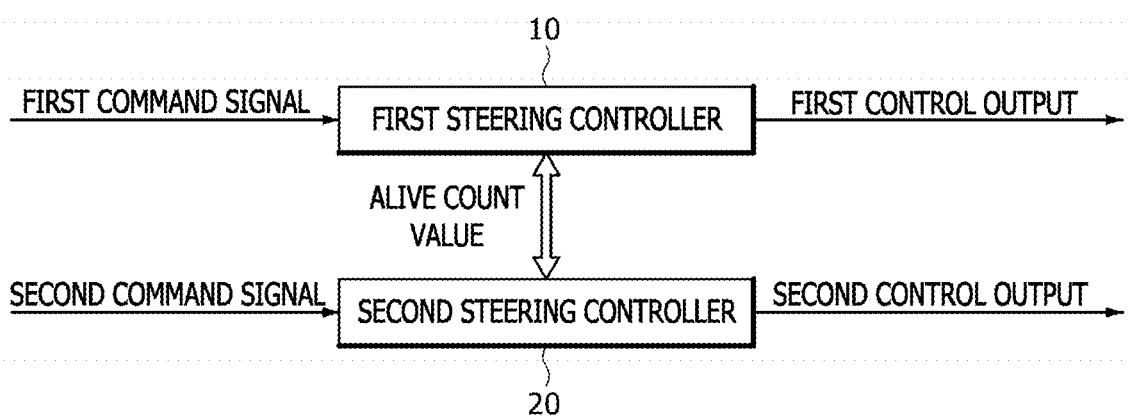
FIG. 1 is a block diagram illustrating a redundant motor driven power steering (MDPS) control apparatus of an autonomous vehicle according to a first embodiment of the present disclosure.

Hereinafter, a steering control method of a redundant steering system will be described below with reference to the accompanying drawings through various exemplary embodiments. In such a process, for clarity and convenience in description, thicknesses of lines, sizes of constituent elements, and the like may be illustrated in an exaggerated manner in the drawings. In addition, terms to be described hereinafter have been defined in consideration of functions in the present disclosure, and may differ depending on a user, an operator's intention, or common practice. Therefore, definitions of these terms should be stated in light of details disclosed throughout the present specification.

FIG. 1 is a block diagram illustrating a redundant motor driven power steering (MDPS) control apparatus of an autonomous vehicle according to a first embodiment of the present disclosure.

Referring to FIG. 1, the redundant MDPS control apparatus of the autonomous vehicle according to the first embodiment of the present disclosure includes a first steering controller 10 and a second steering controller 20.

The first steering controller 10 and the second steering controller 20 are provided inside a steering control system of the autonomous vehicle.

The first steering controller 10 and the second steering controller 20 are formed in pair to provide functional redundancy in the autonomous vehicle. The first steering controller 10 and the second steering controller 20 perform steering control according to each command signal input from a driving controller (not illustrated), a column torque sensor (not illustrated), or the like of the autonomous vehicle.

The first steering controller 10 and the second steering controller 20 may be configured as parts of the MDPS or an electronic power steering (EPS), but are not specifically limited thereto.

The MDPS and the EPS can be easily practiced by those skilled in the art, and thus a detailed description thereof is omitted.

The first steering controller 10 and the second steering controller 20 are connected to the driving controller through controller area network (CAN) communication.

The driving controller inputs a first command signal to the first steering controller 10 and inputs a second command signal to the second steering controller 20.

Accordingly, the first steering controller 10 and the second steering controller 20 independently perform steering control according to the first command signal and the second command signal input from the driving controller and then output a first control output and a second control output, respectively, as a result of the steering control.

The first command signal and the second command signal may each be a command steering angle or column torque. For the first command signal and the second command signal, at least one of the command steering angles and the column torque is selectively input depending on whether a driving mode of the autonomous vehicle is an autonomous driving mode or a driver's steering mode.

The first steering controller 10 and the second steering controller 20 receive the first command signal and the second command signal, respectively, from the driving controller to perform driving control.

When the first steering controller 10 receives the first command signal from the driving controller, the first steering controller 10 performs driving control using the first command signal and generates a first control output as a performance result of the driving control.

When the second steering controller 20 receives the second command signal from the driving controller, the second steering controller 20 performs driving control using the second command signal and generates a second control output as a performance result of the driving control.

For example, the first steering controller 10 and the second steering controller 20 may generate the first control output and the second control output as control signals. The control signal is used for controlling a motor or the like included in MDPS or EPS.

In some embodiments, the first control output and the second control output may be a command for a current value.

The specific method of generating the first control output and the second control output is obvious to those skilled in the art, and thus detailed descriptions are omitted here.

Meanwhile, the first steering controller 10 and the second steering controller 20 receive the first command signal and the second command signal, respectively, from the driving controller as described above. At this time, when an input timing of the first command signal and an input timing of the second command signal match, the first command signal and the second command signal are also synchronized. However, when the input timing of the first command signal and the input timing of the second command signal do not match, the first command signal and the second command signal are not synchronized.

Therefore, when the first steering controller 10 and the second steering controller 20 receive the first command signal and the second command signal, respectively, from the driving controller, at least one of the first steering controller 10 and the second steering controller 20 compensates a control timing according to the first command signal and the second command signal so that the first control output and the second control output are synchronized.

More specifically, when the first steering controller 10 and the second steering controller 20 receive the first command signal and the second command signal, respectively, from the driving controller, the first steering controller 10 and the second steering controller 20 exchange alive count values with each other using internal communication.

Here, the alive count value is a count value that indicates a point of time when the CAN signal is input. That is, the alive count value may be checked in a way that the count value is checked at the point when the CAN signal is input while the count value decreases (increases) according to a count cycle.

The first steering controller 10 and the second steering controller 20 are connected to the driving controller through CAN communication. Therefore, the first steering controller 10 and the second steering controller 20 may exchange the alive count values of the first command signal and the second command signal with each other. The alive count value is a CAN signal.

Therefore, the first steering controller 10 may check both the alive count value of its first command signal and the alive count value of the second command signal.

In addition, the second steering controller 20 also may check both the alive count value of its second command signal and the alive count value of the first command signal.

Accordingly, the first steering controller 10 and the second steering controller 20 may determine their control timing based on the alive count value of the first command signal and the alive count value of the second command signal, respectively.

In this case, the first steering controller 10 determines the control timing according to a difference between the alive count value of the first command signal and the alive count value of the second command signal and an alive count cycle in which the alive count increases.

In addition, the second steering controller 20 determines the control timing according to the difference between the alive count value of the first command signal and the alive count value of the second command signal and the alive count cycle.

For example, in a case where the alive count value of the first dispatch signal is 100 and the alive count value of the second dispatch signal is 98, it appears that the timing of receiving the second command signal in the second steering controller 20 is slower by 2. In addition, when the alive count cycle is 1 ms, the steering control starting point in time of the second steering controller 20 comes 2 ms later than the steering control starting point in time of the first steering controller 10.

Therefore, the first steering controller 10 determines the steering control timing to be 2 ms later than the original steering control starting point in time so that the steering control starting point in time of the first steering controller 10 matches the second steering controller 20.

Meanwhile, since the control timing of the second steering controller 20 comes later than the first steering controller 10, the second steering controller 20 performs the steering control according to the initial control timing.

Hereinafter, referring to FIG. 2, the steering control method of the redundant steering system according to the first embodiment of the present disclosure will be described.

Figure 2:
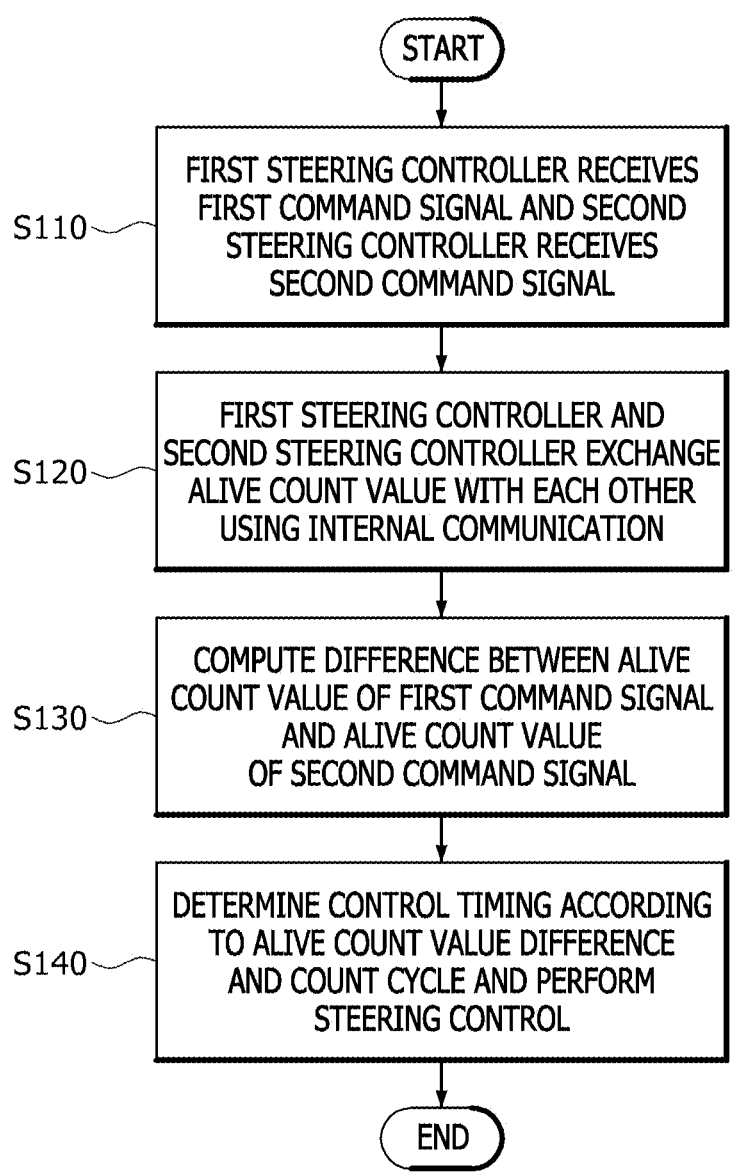
FIG. 2 is a flowchart illustrating a steering control method of a redundant steering system according to the first embodiment of the present disclosure.

FIG. 2 is a flowchart illustrating the steering control method of the redundant steering system according to the first embodiment of the present disclosure.

Referring to FIG. 2, the first steering controller 10 and the second steering controller 20 receive the first command signal and the second command signal first, respectively, from the driving controller (S110).

Each of the first steering controller 10 and the second steering controller 20 exchanges the alive count values with each other using the internal communication (S120).

Accordingly, the first steering controller 10 may check both the alive count value of its first command signal and the alive count value of the second command signal.

In addition, the second steering controller 20 also may check both the alive count value of its second command signal and the alive count value of the first command signal.

Next, each of the first steering controller 10 and the second steering controller 20 detects the difference between the alive count value of the first command signal and the alive count value of the second command signal (S130).

Each of the first steering controller 10 and the second steering controller 20 determines the control timing so that the first control output and the second control output are synchronized according to the difference between the alive count value of the first command signal and the alive count value of the second command signal and the alive count cycle and then performs the steering control according to the determined control timing (S140).

Figure 3:
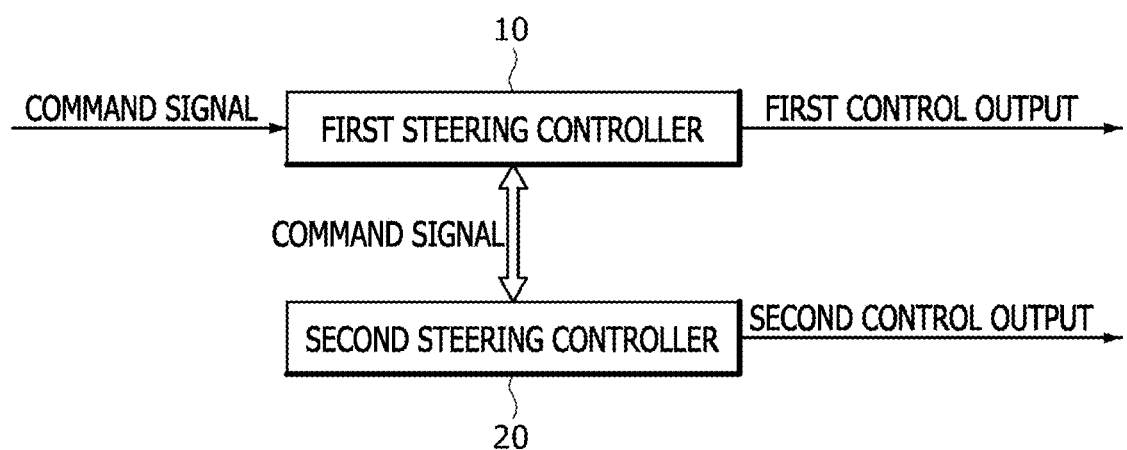
FIG. 3 is a block diagram illustrating a redundant MDPS control apparatus of an autonomous vehicle according to a second embodiment of the present disclosure.

FIG. 3 is a block diagram illustrating a redundant MDPS control apparatus of an autonomous vehicle according to a second embodiment of the present disclosure.

Referring to FIG. 3, the redundant MDPS control apparatus of the autonomous vehicle according to the second embodiment of the present disclosure includes a first steering controller 10 and a second steering controller 20.

In the second embodiment of the present disclosure, detailed descriptions for the same components as in the first embodiment are omitted.

In the first embodiment of the present disclosure, an example of a case of a system where the first steering controller 10 and the second steering controller 20 independently receive the first command signal and the second command signal, respectively, has been described.

However, in the second embodiment of the present disclosure, an example of a case of a system where only the first steering controller 10 receives a command signal and the first steering controller 10 transmits the command signal to the second steering controller 20 through internal communication will be described.

The first steering controller 10 receives the command signal from the driving controller and then transmits the command signal to the second steering controller 20 through the internal communication.

In this case, there may be a communication delay between the first steering controller 10 and the second steering controller 20.

Therefore, the first steering controller 10 transmits the command signal to the second steering controller 20, compensates the control timing for a predetermined set time, and then matches the first control output of the first steering controller 10 and the second control output of the second steering controller 20 to be synchronized.

Here, the set time is a communication delay time during the internal communication between the first steering controller 10 and the second steering controller 20.

Therefore, the first steering controller 10 transmits the command signal to the second steering controller 20 and then performs the steering control after the predetermined communication delay time has elapsed from the original starting point in time of the steering control.

On the other hand, the second steering controller 20 performs the steering control at its predetermined point of time for the steering control.

Consequently, the first control output of the first steering controller 10 and the second control output of the second steering controller 20 are synchronized.

Hereinafter, referring to FIG. 4, the steering control method of the redundant steering system according to the second embodiment of the present disclosure will be described.

Figure 4:
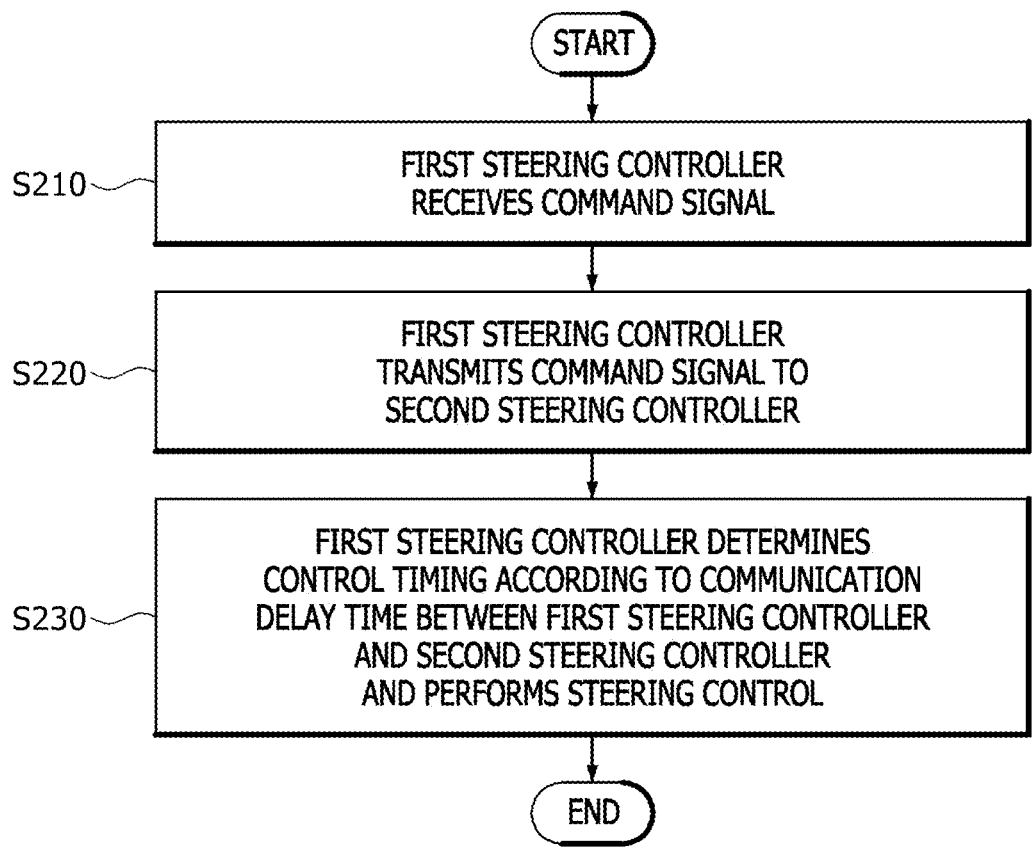
FIG. 4 is a flowchart illustrating a steering control method of a redundant steering system according to the second embodiment of the present disclosure.

FIG. 4 is a flowchart illustrating the steering control method of the redundant steering system according to the second embodiment of the present disclosure.

Referring to FIG. 4, the first steering controller 10 receives the command signal from the driving controller (S210).

Then, the first steering controller 10 transmits the command signal to the second steering controller 20 (S220).

Next, the first steering controller 10 determines the control timing according to the communication delay time between the first steering controller 10 and the second steering controller 20 and then performs the steering control (S230). That is, the first steering controller 10 performs the steering control after the predetermined communication delay time has elapsed from the original starting point in time of the steering control (S230).

On the other hand, the second steering controller 20 performs the steering control at its predetermined point of time for the steering control.

Therefore, the first steering controller 10 and the second steering controller 20 simultaneously start steering control, and the first control output of the first steering controller 10 and the second control output of the second steering controller 20 are synchronized.

In this way, the steering control method of the redundant steering system according to the embodiment of the present disclosure improves the performance of the redundant MDPS system by matching the operation timings of the first steering controller and the second steering controller.

The implementations described in the present specification may be performed by, for example, a method or a process, an apparatus, a software program, a data stream, or a signal. Although being discussed only in the context of single-form implementation (e.g., being discussed only as a method), the discussed features may be implemented even in another form (e.g., apparatus or program). The apparatus may be implemented as proper hardware, software, and firmware. The method may be implemented as, for example, an apparatus, such as a processor generally indicating a processing device including a computer, a microprocessor, an integrated circuit, or a programmable logic device. The processor also includes communication devices such as computers, cell phones, personal digital assistants (PDAs), and other devices that facilitate the communication of information between end users.

The present disclosure has been described with reference to exemplary embodiments illustrated in the accompanying drawings, but this is only for exemplary purposes, and those skilled in the art will appreciate that various modifications and other equivalent exemplary embodiments are possible. Thus, the true technical scope of the disclosure should be defined by the following claims.

What is claimed is:

1. A steering control method for a redundant steering system, said method comprising:
    receiving, by a first steering controller and a second steering controller, a first command signal and a second command signal, respectively; and
    synchronizing control outputs of the first steering controller and the second steering controller such that at least one of the first steering controller and the second steering controller compensates a control timing according to the first command signal and the second command signal so that the control outputs are synchronized,
    wherein, during synchronizing of the control outputs of the first steering controller and the second steering controller, the first steering controller and the second steering controller determine control timings based on alive count values of the first command signal and the second command signal, respectively, wherein the alive count values comprise times at which each of the first command signal and the second command signal are input into the first steering controller or the second steering controller, respectively.

2. The method of claim 1, wherein each of the first command signal and the second command signal is a command steering angle or column torque.

3. The method of claim 1, wherein, during synchronizing of the control outputs such that at least one of the first steering controller and the second steering controller compensates the control timing, the first steering controller and the second steering controller exchange the first command signal and the second command signal and determine the control timing according to a difference between the alive count value of the first command signal and the alive count value of the second command signal and an alive count cycle, wherein the alive count cycle comprises a predetermined time period.

4. The method of claim 1, wherein each of the first steering controller and the second steering controller is a motor driven power steering (MDPS) system or an electronic power steering (EPS) system.

5. A redundant steering system comprising:
    a first steering controller configured to receive a first command signal and output a first control output; and
    a second steering controller configured to receive a second command signal and output a second control output,
    wherein the first steering controller and the second steering controller exchange information on an input point of time for a command signal, determine a control timing according to the information on the input point of time for the command signal, and synchronize control outputs of the first steering controller and the second steering controller,
    wherein, during synchronizing of the control outputs of the first steering controller and the second steering controller, the first steering controller and the second steering controller determine control timings based on alive count values of the first command signal and the second command signal, respectively, wherein the alive count values comprise times at which each of the first command signal and the second command signal are input into the first steering controller or the second steering controller, respectively.

6. The redundant steering system of claim 5, wherein each of the first command signal and the second command signal is a command steering angle or column torque.

7. The redundant steering system of claim 5, wherein each of the first steering controller and the second steering controller is a motor driven power steering (MDPS) system or an electronic power steering (EPS) system.

* * * * *